May 8, 1962 A. G. STIMSON ETAL 3,033,094
AUTOMATIC EXPOSURE CONTROL SYSTEM
Original Filed June 30, 1958
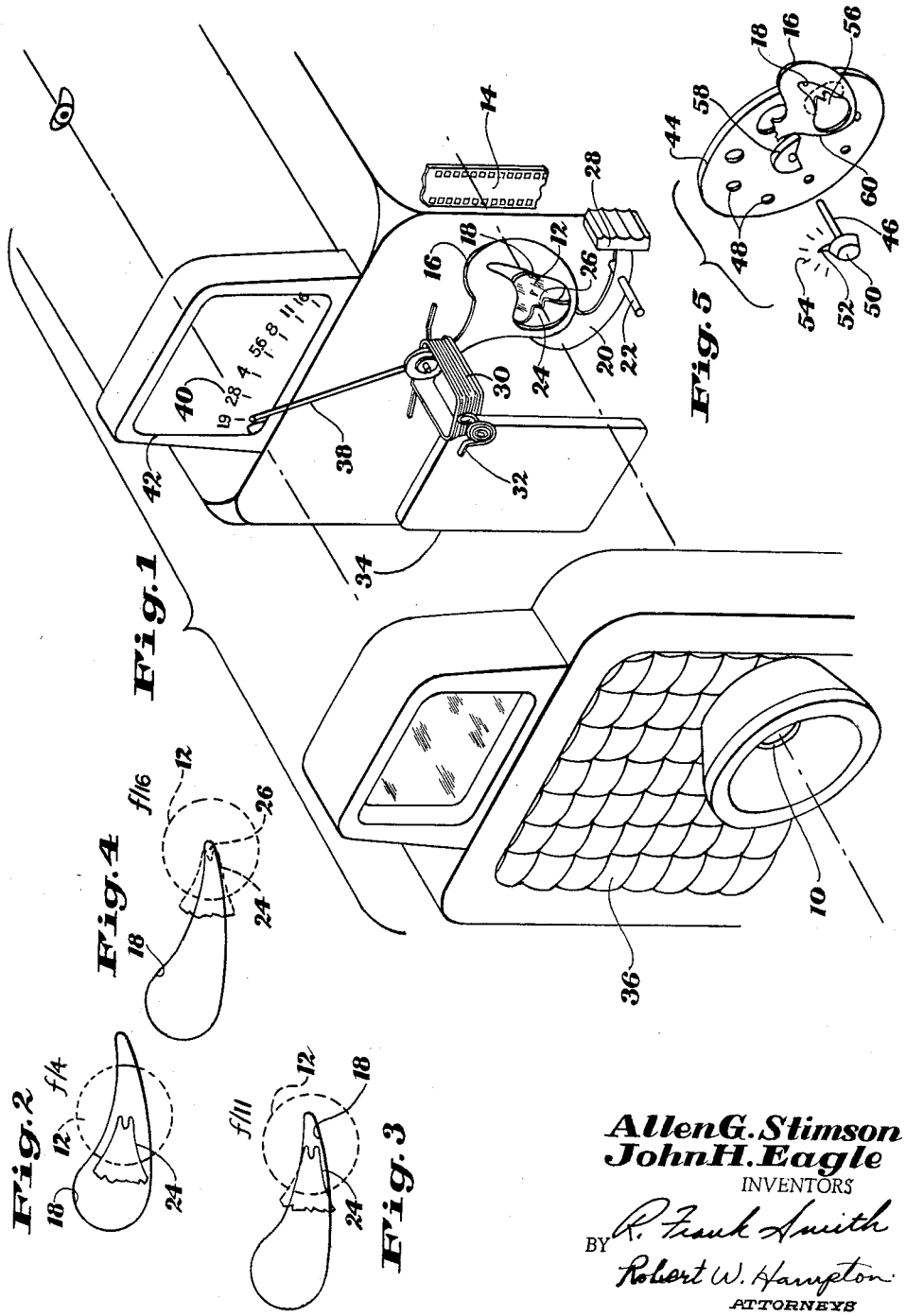
Allen G. Stimson
John H. Eagle
INVENTORS
BY R. Frank Smith
Robert W. Hampton
ATTORNEYS

United States Patent Office 3,033,094
Patented May 8, 1962

3,033,094
AUTOMATIC EXPOSURE CONTROL SYSTEM
Allen G. Stimson and John H. Eagle, Rochester, N.Y., assignors to Eastman Kodak Company, Rochester, N.Y., a corporation of New Jersey
Original application June 30, 1958, Ser. No. 745,460. Divided and this application May 11, 1959, Ser. No. 812,477
3 Claims. (Cl. 95—64)

The present invention relates to photographic cameras having automatic exposure control and more particularly concerns means for manually overriding the exposure control of such cameras.

This application is a division of the copending U.S. application Serial No. 745,460, filed June 30, 1958, which discloses and claims an improved diaphragm for photographic cameras.

It is a common practice in motion picture and still cameras to automatically regulate the size of a diaphragm opening as a function of the brightness of a scene that is to be photographed. Such regulation is usually referred to as automatic exposure control and typically employs a photocell for receiving light from the scene, a permanent-magnet moving-coil instrument energized by the cell, and a diaphragm mechanism coupled to the moving coil of the instrument. The current output of the cell varies with the intensity of light on it and in turn varies the energization of the instrument to adjust the diaphragm mechanism as a function of the light intensity.

One of the simplest automatically controlled diaphragms comprises one or more diaphragm vanes moving in timed relation with the instrument coil, each vane having a generally teardrop- or V-shaped aperture that cooperates with the apertures of the other vanes and with a fixed aperture on the lens axis of the camera. As the coil moves in response to increased scene brightness the vane or vanes superimpose narrower portions of their respective apertures over the fixed aperture to reduce the area of the composite exposure aperture.

A camera that is equipped with an automatic exposure control system of the above type ordinarily requires no manual setting of the exposure factors. However, in situations where there is unusual backlighting of the photographic subject, or if for any other reason a deliberate overexposure or underexposure is desired, it is convenient to provide manually operable means for overriding the automatic system and manually adjusting the exposure aperture to a desired area.

It is therefore a primary object of the invention to manually override the automatic control of a camera diaphragm.

More specifically it is an object of the invention to regulate the exposure aperture of a camera by means of at least one movable vane that is positioned automatically as a function of scene brightness and to selectively override such automatic regulation by disabling the movable vane or vanes and employing a manually selected one of a series of fixed apertures.

A further object is to automatically control a movable diaphragm vane by an exposure meter and to manually disable that vane by selectively positioning a rotatable disc having a series of fixed apertures of graduated size.

Other objects of the invention will appear from the following description, reference being made to the accompanying drawings, wherein:

FIG. 1 is an exploded perspective view of a motion picture camera showing the physical arrangement of the parts of a first embodiment of the invention;

FIGS. 2, 3 and 4 illustrate the relative positions of the fixed and movable apertures and the mask of FIG. 1 at typical aperture values; and FIG. 5 is an exploded perspective view of a manual override mechanism for disabling the automatic exposure control system of the camera.

Referring to FIG. 1, the invention is illustrated in the environment of a motion picture camera, although it is understood that it may be used equally well in a still camera. Light enters the camera and is focused on the film 14 through an optional front lens element 10 and a rear lens element 12, the latter of which constitutes a fixed aperture. The amount of light transmitted through the fixed aperture 12 is controlled by the position of a diaphragm vane 16, which is formed preferably of thin aluminum and has an elongated and curved teardrop-shaped aperture 18 overlying aperture 12. A lever 20 is pivoted on a shaft 22 closely parallel to vane 16, and has on one end a mask 24, which has the general shape of an inverted V. Mask 24 overlies a segment of aperture 12 extending from the periphery of that aperture to approximately its center. Preferably, the area of the mask is somewhat less than half the area of aperture 12. The extreme end of the mask may be indented, as shown at 26, for a reason to be explained hereinafter.

Diaphragm vane 16 is mounted on a coil 30 of a galvanometer-type electric instrument and rotates with the coil to align various portions of aperture 18 with the fixed aperture 12. Coil 30 and its instrument are well known in the art and are shown, for example, in U.S. Patent 1,927,346, granted September 19, 1933 to L. E. Lawrence. Coil 30 receives energizing voltage through a pair of control springs, one which is shown at 32, from a photosensitive element 34 which may be of the usual photovoltaic type. Element 34 is exposed to the viewed scene through a lenticular lens system 36. It is well known that the angular position assumed by a pivoted moving coil of an electric measuring instrument, such as coil 30 of FIG. 1, connected to the output of a photovoltaic element, such as element 34, is a function of the intensity of the light incident on the photosensitive element. The disposition of diaphragm vane 16 relative to aperture 12 is such that the width of the portion of aperture 18 aligned with aperture 12 by the movement of coil 30 is an inverse function of the intensity of the light incident on element 34.

A pointer 38 is integral with coil 30 and is rotated thereby for cooperation with an aperture scale 40 in a viewfinder 42 of the camera. For simplicity of illustration, scale 40 is shown as reversed image of its usual appearance from the front of the camera.

Referring again to mask 24, it will be seen that for the higher aperture values, corresponding to the smaller diaphragm openings, the mask cooperates with vane 16 to form a composite aperture which is substantially centralized over the fixed aperture 12. The centralization of the composite aperture is shown particularly in FIGS. 3 and 4, wherein vane 16 is illustrated in its approximate positions for aperture values of $f/11$ and $f/16$, respectively. It will be apparent that in the absence of mask 24, vane 16 would have to be moved further to the left for each of these aperture values and would have to cooperate with the left-hand periphery of the fixed aperture 12, thereby limiting the light path primarily to a peripheral portion of aperture 12, which is undesirable for the reasons previously set forth.

In FIG. 4, in particular, it can be seen that the relieved portion 26 of mask 24 cooperates with the extreme inner surface of aperture 18 to form a centralized, composite aperture for the smallest diaphragm openings.

FIG. 2 illustrates the relative positions of apertures 12 and 18 and mask 24 for one of the larger diaphragm openings. Although in this case a considerable portion of the peripheral areas of aperture 12 is used in the light path, this portion is not as great as it would be in the absence of the mask.

When the intensity of the viewed light is at so low a value that it corresponds to an aperture value below the limit of scale 40, mask 24 may be manually rotated away from aperture 12 by means of a finger knob 28 (FIG. 1). For this purpose lever 20 is frictionally rotatable about its shaft 22. If it is deemed unnecessary to remove mask 24 from aperture 12, lever 20 may be eliminated and the mask may be formed as a fixed member; for example, it may constitute an extension from the periphery of aperture 12.

FIG. 5 illustrates one form of structural organization by means of which the automatic operation of the diaphragm vane of FIG. 1 may be overridden manually for setting the diaphragm opening at any of a series of selected values. A disk 44 that is pivoted at its center along with a shaft 46 has a series of circular apertures 48 of graduated areas arranged with their centers at equal radial distances from shaft 46. Disk 44 is mounted on the camera by shaft 46 at a position such that a circle passing through the centers of apertures 48 also passes through a line normal to the center of the fixed lens aperture 12 (FIG. 1). A knob 50 (FIG. 5) integral with shaft 46 may be used to rotate the shaft and disk for aligning any of the apertures 48 with aperture 12. Knob 50 may be provided with a pointer 52 to cooperate with an aperture scale 54 which is conveniently located on an outside surface of the camera.

Each of the two largest apertures 48 on disk 44 has approximately the same diameter as the fixed aperture 12 of the camera and one of these is provided with a mask 56 shaped like the previously described mask 24, shown in FIG. 1. When the masked aperture 48 is aligned with aperture 12 its mask 56 performs the function of mask 24, and the cooperative relation between the mask, the fixed aperture 12 and the moving vane 16 is the same as described above in relation to FIG. 1. When disk 44 is rotated to any other position, i.e., when any aperture 48 other than the masked one is aligned with aperture 12, a cam 58, which is integral with and approximately centered on the disk, cooperates with a lower surface 60 of diaphragm vane 16 and maintains the vane in a position wherein the maximum-width portion of its aperture 18 is aligned with aperture 12, thereby preventing any automatic positioning of the vane. In this case, the size of the aperture 48 aligned with aperture 12 controls the amount of light admitted into the camera, and the aperture value can be read from scale 54 rather than from scale 40.

The invention has been described in detail with particular reference to preferred embodiments thereof, but it will be understood that variations and modifications can be effected within the spirit and scope of the invention as described hereinabove and as defined in the appended claims.

We claim:

1. In a photographic camera having means for focusing an image of a viewed scene onto a photosensitive surface; an exposure meter disposed for energization by light from said scene and having an output member moved as a function of the brightness of said scene; and at least one diaphragm vane coupled to said output member and having a tapered aperture movable relative to said focusing means in response to movement of said output member, for regulating the admission of scene light to said photosensitive surface as a function of scene brightness; the improvement of means for manually regulating the admission of scene light to said surface, comprising: a movable override device having a plurality of apertures of at least two different sizes and having an initial position wherein a first one of said plurality of apertures is aligned with said focusing means; manually operable means for moving said override device to at least one other position to align a second one of said plurality of apertures with said focusing means; and means interrelating said override device and said diaphragm vane for holding said vane in a predetermined position in response to movement of said override device away from its initial position.

2. The regulating means defined in claim 1, wherein said interrelating means comprises cooperating cam surfaces on said override device and said diaphragm vane.

3. In a photographic camera having means for focusing an image of a viewed scene onto a photosensitive surface; an exposure meter disposed for energization by light from said scene and having a pivoted coil moved within a predetermined angular range as a function of the brightness of said scene; and a diaphragm vane connected to said coil for pivotal movement therewith, said vane having a tapered aperture movable relative to said focusing means in response to movement of said coil, for regulating the admission of scene light to said photosensitive surface as a function of scene brightness; the improvement of means for manually regulating the admission of scene light to said surface, comprising: an override disc mounted in said camera for pivoting movement and having a plurality of apertures of at least two different sizes disposed about its periphery, said disc having an initial angular position wherein a first one of said plurality of apertures is aligned with said focusing means; a knob accessible from the outside of said camera and connected to said disc for rotating the latter in response to rotation of said knob; a first cam surface movable with said disc; and a second cam surface movable with said vane and cooperating with said first cam surface to hold said vane in a predetermined position corresponding to maximum vane aperture, in response to rotation of said disc away from its initial position.

References Cited in the file of this patent

UNITED STATES PATENTS

| | | |
|---|---|---|
| 2,058,562 | Bucky et al. | Oct. 27, 1936 |
| 2,163,737 | Prinsen | June 27, 1939 |
| 2,841,064 | Bagby et al. | July 1, 1958 |